(12) United States Patent
Chalberg, Jr.

(10) Patent No.: US 11,718,052 B2
(45) Date of Patent: Aug. 8, 2023

(54) CONTACT LENSES FOR REDUCING MYOPIA AND METHODS FOR MAKING THE SAME

(71) Applicant: SIGHTGLASS VISION, INC., Palo Alto, CA (US)

(72) Inventor: Thomas W. Chalberg, Jr., Menlo Park, CA (US)

(73) Assignee: SightGlass Vision, Inc., Palo Alto, CA (US)

( * ) Notice: Subject to any disclaimer, the term of this patent is extended or adjusted under 35 U.S.C. 154(b) by 191 days.

(21) Appl. No.: 16/612,319

(22) PCT Filed: May 8, 2018

(86) PCT No.: PCT/US2018/031506
§ 371 (c)(1),
(2) Date: Nov. 8, 2019

(87) PCT Pub. No.: WO2018/208724
PCT Pub. Date: Nov. 15, 2018

(65) Prior Publication Data
US 2020/0241325 A1      Jul. 30, 2020

Related U.S. Application Data

(60) Provisional application No. 62/502,992, filed on May 8, 2017.

(51) Int. Cl.
*B29D 11/00* (2006.01)
*G02C 7/04* (2006.01)

(52) U.S. Cl.
CPC .. *B29D 11/00048* (2013.01); *B29D 11/00038* (2013.01); *G02C 7/049* (2013.01); *G02C 2202/24* (2013.01)

(58) Field of Classification Search
CPC ............. B29D 11/00048; G02C 7/049; G02C 2202/24
See application file for complete search history.

(56) References Cited

U.S. PATENT DOCUMENTS

| 149,270 A | 3/1847 | Watson |
|---|---|---|
| 338,003 A | 3/1886 | Ward |

(Continued)

FOREIGN PATENT DOCUMENTS

| AU | 2005289302 | 4/2006 |
|---|---|---|
| CN | 1909860 | 2/2007 |

(Continued)

OTHER PUBLICATIONS

EP Extended European Search Report in International Appln. No. 18798444.8, dated Jun. 22, 2021, 13 pages.

(Continued)

*Primary Examiner* — Mathieu D Vargot
(74) *Attorney, Agent, or Firm* — Fish & Richardson P.C.

(57) ABSTRACT

A method of making a contact lens includes providing a cylindrical blank for the contact lens, the cylindrical blank including a first portion and a second portion. The first portion is formed from a homogenous, optically clear material and the second portion is formed from an inhomogeneous, optically-scattering material. The method includes shaping the cylindrical blank to provide the contact lens. The contact lens includes a first region surrounded by a second region, the first region being formed from the homogenous, optically clear material and the second region being formed from the inhomogeneous, optically-scattering material.

16 Claims, 9 Drawing Sheets

(56) References Cited

U.S. PATENT DOCUMENTS

| | | | |
|---|---|---|---|
| 506,983 | A | 10/1893 | Diemmer et al. |
| 712,466 | A | 10/1902 | Taylor |
| 3,034,166 | A | 5/1962 | Bell |
| 3,507,566 | A | 4/1970 | Knapp |
| 4,194,814 | A | 3/1980 | Fischer et al. |
| 4,338,003 | A | 7/1982 | Adrian |
| 4,460,523 | A | 7/1984 | Neefe |
| 4,558,931 | A | 12/1985 | Fuhrman |
| 4,704,016 | A | 11/1987 | de Carle |
| 4,710,327 | A | 12/1987 | Neefe |
| 4,909,818 | A | 3/1990 | Jones |
| 5,034,100 | A | 7/1991 | Sides |
| 5,034,166 | A | 7/1991 | Rawlings et al. |
| 5,034,188 | A | 7/1991 | Rawlings et al. |
| 5,260,727 | A | 11/1993 | Oksman et al. |
| 5,585,968 | A | 12/1996 | Guhman |
| 5,800,992 | A | 9/1998 | Fodor |
| 5,867,247 | A | 2/1999 | Martin et al. |
| 5,905,561 | A | 5/1999 | Lee et al. |
| 5,926,250 | A | 7/1999 | Mukaiyama et al. |
| 6,149,270 | A | 11/2000 | Hayashi |
| 6,203,156 | B1 * | 3/2001 | Wu .................. B29D 11/00336 351/159.69 |
| 6,343,861 | B1 | 2/2002 | Kris et al. |
| 6,582,908 | B2 | 6/2003 | Fodor |
| 6,706,867 | B1 | 3/2004 | Lorenz |
| 6,712,466 | B2 | 3/2004 | Dreher |
| 6,712,467 | B1 | 3/2004 | Kitani |
| 6,754,299 | B2 | 6/2004 | Patch |
| 7,025,460 | B2 | 4/2006 | Smitth et al. |
| 7,506,983 | B2 | 3/2009 | To et al. |
| 7,665,842 | B2 | 2/2010 | Ho et al. |
| 7,766,482 | B2 | 8/2010 | Smith et al. |
| 7,862,171 | B2 | 1/2011 | Varnas et al. |
| 7,992,997 | B2 | 8/2011 | Varnas |
| 7,997,727 | B2 | 8/2011 | Ho et al. |
| 8,052,278 | B2 | 11/2011 | Bovet |
| 8,057,034 | B2 | 11/2011 | Ho et al. |
| 8,079,702 | B2 | 12/2011 | Ballet |
| 8,162,477 | B2 | 4/2012 | Carimalo et al. |
| 8,240,847 | B2 | 8/2012 | Holden et al. |
| RE43,851 | E | 12/2012 | To et al. |
| 8,342,684 | B2 | 1/2013 | Ho et al. |
| 8,500,278 | B2 | 8/2013 | Lo et al. |
| 8,540,365 | B2 | 9/2013 | Varnas |
| 8,684,520 | B2 | 4/2014 | Lindacher et al. |
| 8,690,319 | B2 | 4/2014 | Menezes |
| 8,807,747 | B2 | 8/2014 | Guilloux et al. |
| RE45,147 | E | 9/2014 | To et al. |
| 8,833,936 | B2 | 9/2014 | Varnas |
| 8,926,092 | B2 | 1/2015 | Weeber |
| 8,931,897 | B2 | 1/2015 | Holden et al. |
| 8,950,860 | B2 | 2/2015 | Tse et al. |
| 8,951,729 | B2 | 2/2015 | Neitz et al. |
| 8,992,010 | B2 | 3/2015 | Ho et al. |
| 8,998,408 | B2 | 4/2015 | Wei et al. |
| 9,360,683 | B2 | 6/2016 | Buehren |
| 9,417,463 | B2 | 8/2016 | Brennan et al. |
| 9,423,633 | B2 | 8/2016 | Ho et al. |
| 9,547,182 | B2 | 1/2017 | Collins et al. |
| 9,594,259 | B2 | 3/2017 | Brennan et al. |
| 9,625,739 | B2 | 4/2017 | Brennan et al. |
| 9,709,819 | B2 | 7/2017 | Lippens et al. |
| 9,720,253 | B2 | 8/2017 | Neitz et al. |
| 9,733,494 | B2 | 8/2017 | Brennan et al. |
| 9,746,693 | B2 | 8/2017 | Peloux et al. |
| 9,829,722 | B2 | 11/2017 | Tse et al. |
| 10,012,849 | B2 | 7/2018 | Collins et al. |
| RE47,006 | E | 8/2018 | To et al. |
| 10,042,091 | B2 | 8/2018 | Kildishev |
| 10,061,143 | B2 | 8/2018 | Brennan et al. |
| 10,156,737 | B2 | 12/2018 | Martinez et al. |
| 10,231,897 | B2 | 3/2019 | Tse et al. |
| 10,247,964 | B2 | 4/2019 | Sankaridurg et al. |
| 10,302,962 | B2 | 5/2019 | Neitz et al. |

| | | | |
|---|---|---|---|
| 2001/0050750 | A1 * | 12/2001 | Breger .................. G02C 7/041 351/159.08 |
| 2002/0140900 | A1 * | 10/2002 | Streibig ................ B41F 17/001 351/159.28 |
| 2003/0082576 | A1 | 5/2003 | Jones |
| 2004/0110179 | A1 | 6/2004 | Shuber |
| 2004/0150787 | A1 | 8/2004 | Niculas |
| 2005/0208555 | A1 | 9/2005 | Raimond, III |
| 2006/0082729 | A1 | 4/2006 | To et al. |
| 2006/0235428 | A1 | 10/2006 | Silvestrini |
| 2007/0026167 | A1 | 2/2007 | Bourdelais et al. |
| 2007/0115431 | A1 | 5/2007 | Smith et al. |
| 2007/0247588 | A1 | 10/2007 | Cano |
| 2008/0030675 | A1 | 2/2008 | Dillon |
| 2008/0084534 | A1 | 4/2008 | Lindacher et al. |
| 2008/0151183 | A1 | 6/2008 | Altmann |
| 2008/0221674 | A1 | 9/2008 | Blum |
| 2008/0309882 | A1 | 12/2008 | Thom et al. |
| 2009/0059168 | A1 | 3/2009 | Miller et al. |
| 2010/0021889 | A1 | 1/2010 | Juo |
| 2010/0091240 | A1 | 4/2010 | Drobe et al. |
| 2010/0149488 | A1 | 6/2010 | Lo et al. |
| 2010/0318185 | A1 * | 12/2010 | Nunez .................. G02B 1/043 351/159.33 |
| 2011/0051079 | A1 | 3/2011 | Martinez |
| 2011/0194195 | A1 | 8/2011 | Zalevsky et al. |
| 2011/0313058 | A1 | 12/2011 | Neitz et al. |
| 2012/0014977 | A1 | 1/2012 | Furihata |
| 2012/0062836 | A1 | 3/2012 | Tse et al. |
| 2012/0182520 | A1 | 7/2012 | Neitz et al. |
| 2013/0053425 | A1 | 2/2013 | To et al. |
| 2013/0103147 | A1 | 4/2013 | Christie et al. |
| 2013/0107206 | A1 | 5/2013 | Slater |
| 2014/0080900 | A1 | 3/2014 | Neitz et al. |
| 2014/0111763 | A1 | 4/2014 | Griffin |
| 2015/0036102 | A1 | 2/2015 | Ghosh et al. |
| 2015/0109574 | A1 | 4/2015 | Tse et al. |
| 2015/0111782 | A1 | 4/2015 | Neitz et al. |
| 2015/0151500 | A1 * | 6/2015 | Yin .................. B29D 11/00125 264/1.38 |
| 2015/0316788 | A1 | 11/2015 | Holden et al. |
| 2015/0331255 | A1 | 11/2015 | Sankaridurg et al. |
| 2016/0026000 | A1 | 1/2016 | Kester |
| 2016/0143801 | A1 | 5/2016 | Lam et al. |
| 2016/0306192 | A1 | 10/2016 | Marshall et al. |
| 2016/0377884 | A1 | 12/2016 | Lau et al. |
| 2017/0115509 | A1 | 4/2017 | Brennan et al. |
| 2017/0131567 | A1 | 5/2017 | To et al. |
| 2017/0168320 | A1 | 6/2017 | Tsubota et al. |
| 2017/0184875 | A1 | 6/2017 | Newman |
| 2017/0189168 | A1 | 7/2017 | Zickler et al. |
| 2017/0192252 | A1 | 7/2017 | Brennan et al. |
| 2017/0276963 | A1 | 9/2017 | Brennan et al. |
| 2017/0292160 | A1 | 10/2017 | Neitz et al. |
| 2017/0336653 | A1 | 11/2017 | Bakaraju |
| 2018/0112268 | A1 | 4/2018 | Neitz et al. |
| 2018/0275425 | A1 | 9/2018 | Collins et al. |
| 2018/0275427 | A1 | 9/2018 | Lau et al. |
| 2019/0033619 | A1 | 1/2019 | Neitz et al. |

FOREIGN PATENT DOCUMENTS

| | | |
|---|---|---|
| CN | 101198434 | 6/2008 |
| CN | 101273882 | 10/2008 |
| CN | 101595420 | 12/2009 |
| CN | 101730500 | 6/2010 |
| CN | 102238927 | 11/2011 |
| CN | 103097940 | 5/2013 |
| CN | 104094164 | 10/2014 |
| CN | 104094165 | 10/2014 |
| CN | 104678572 | 6/2015 |
| CN | 105378545 | 3/2016 |
| CN | 102892380 | 10/2016 |
| EP | 0457612 | 11/1991 |
| EP | 1799166 | 6/2007 |
| EP | 2131721 | 12/2009 |
| EP | 2548533 | 7/2011 |
| EP | 2616876 | 7/2013 |

(56) References Cited

FOREIGN PATENT DOCUMENTS

| | | |
|---|---|---|
| JP | S5829627 | 2/1983 |
| JP | 60-046523 | 3/1985 |
| JP | 2006-184477 | 7/2006 |
| JP | 2008514318 | 5/2008 |
| JP | 4891249 | 3/2012 |
| JP | 2013537317 | 9/2013 |
| KR | 100686551 | 2/2007 |
| TW | 201211618 | 3/2012 |
| TW | 201307942 | 2/2013 |
| TW | I551912 | 10/2016 |
| TW | I559044 | 11/2016 |
| TW | I561885 | 12/2016 |
| WO | WO199731286 | 8/1997 |
| WO | WO199966366 | 12/1999 |
| WO | WO200052516 | 9/2000 |
| WO | WO2006034652 | 4/2006 |
| WO | WO2006113149 | 10/2006 |
| WO | WO2007082268 | 7/2007 |
| WO | WO2008045847 | 4/2008 |
| WO | WO2008059178 | 5/2008 |
| WO | WO2008083418 | 7/2008 |
| WO | WO2010019397 | 2/2010 |
| WO | WO2010075319 | 7/2010 |
| WO | WO2010088644 | 8/2010 |
| WO | WO2007/132834 | 11/2011 |
| WO | WO2012034265 | 3/2012 |
| WO | WO2013015743 | 1/2013 |
| WO | WO2013134825 | 9/2013 |
| WO | WO2014194444 | 12/2014 |
| WO | WO2015055322 | 4/2015 |
| WO | WO2015147758 | 10/2015 |
| WO | WO2015186723 | 12/2015 |
| WO | WO2017178430 | 10/2017 |
| WO | WO2018026697 | 2/2018 |
| WO | WO2018076057 | 5/2018 |
| WO | WO2018208724 | 11/2018 |
| WO | WO2019166653 | 9/2019 |
| WO | WO2020138127 | 7/2020 |

OTHER PUBLICATIONS

EP Supplementary Search Report in International Appln. No. 187984444, dated Jan. 29, 2021, 12 pages.
CN Office Action in Chinese Application No. 201780052098.7, dated Mar. 9, 2020, 34 pages.
Montana.edu [online] Shaw, "Optical System Design—S15," [Retrieved on Jan. 7, 2019], Retrieved from: http://www.montana.edu/jshaw/documents/18%20EELE582_S15_OTFMTF.pdf, 18 pages.
SG Search Report and Written Opinion in Singaporean Application No. 11201900867U, dated Apr. 7, 2020, 14 pages.
slrlounge.com [online] Jirsa, "Diffraction, Aperture, and Starburst Effects," dated Feb. 9, 2011, [Retrieved on Jan. 7, 2019] Retrieved from https://www.slrlounge.com/diffraction-aperture-and-starburst-effects/, 11 pages.
International Search Report/Written Opinion dated Aug. 24, 2018 by USPTO as ISA, 40 pgs.
Office Action in Taiwanese Appln. No. 107115604, dated Mar. 13, 2019, 7 pages (with English translation).
Office Action in Japanese Appln No. 2020-512767, dated May 9, 2022, 10 pages (with English translation).

\* cited by examiner

CONTACT LENSES FOR REDUCING MYOPIA AND METHODS FOR MAKING THE SAME

FIELD OF THE INVENTION

The invention features contact lenses for reducing myopia and methods for making such lenses.

BACKGROUND

The eye is an optical sensor in which light from external sources is focused, by a lens, onto the surface of the retina, an array of wavelength-dependent photosensors. Each of the various shapes that the eye lens can adopt is associated with a focal length at which external light rays are optimally or near-optimally focused to produce inverted images on the surface of the retina that correspond to external images observed by the eye. The eye lens, in each of the various shapes that the eye lens can adopt, optimally or near-optimally, focuses light emitted by, or reflected from external objects that lie within a certain range of distances from the eye, and less optimally focuses, or fails to focus objects that lie outside that range of distances.

In normal-sighted individuals, the axial length of the eye, or distance from the lens to the surface of the retina, corresponds to a focal length for near-optimal focusing of distant objects. The eyes of normal-sighted individuals focus distant objects without nervous input to muscles which apply forces to alter the shape of the eye lens, a process referred to as "accommodation." Closer, nearby objects are focused, by normal individuals, as a result of accommodation.

Many people, however, suffer from eye-length-related disorders, such as myopia ("nearsightedness"). In myopic individuals, the axial length of the eye is longer than the axial length required to focus distant objects without accommodation. As a result, myopic individuals can view near objects clearly, but objects further away are blurry. While myopic individuals are generally capable of accommodation, the average distance at which they can focus objects is shorter than that for normal-sighted individuals.

Typically, infants are born hyperopic, with eye lengths shorter than needed for optimal or near-optimal focusing of distant objects without accommodation. During normal development of the eye, referred to as "emmetropization," the axial length of the eye, relative to other dimensions of the eye, increases up to a length that provides near-optimal focusing of distant objects without accommodation. Ideally, biological processes maintain the near-optimal relative eye length to eye size as the eye grows to final, adult size. However, in myopic individuals, the relative axial length of the eye to overall eye size continues to increase during development, past a length that provides near-optimal focusing of distant objects, leading to increasingly pronounced myopia.

It is believed that myopia is affected by behavioral factors as well as genetic factors. Accordingly, myopia may be mitigated by therapeutic devices which address behavioral factors. For example, therapeutic devices for treating eye-length related disorders, including myopia, are described in U.S. Pub. No. 2011/0313058A1.

SUMMARY

In general, in one aspect, the invention features a method of making a contact lens, including providing a cylindrical blank for the contact lens, the cylindrical blank including a first portion and a second portion. The first portion is formed from a homogenous, optically clear material and the second portion is formed from an inhomogeneous, optically-scattering material. The method includes shaping (e.g., grinding) the cylindrical blank to provide the contact lens. The contact lens includes a first region surrounded by a second region, the first region being formed from the homogenous, optically clear material and the second region being formed from the inhomogeneous, optically-scattering material.

Implementations of the method can include one or more of the following features and/or features of other aspects. For example, the first portion can be a cylindrical portion and the second portion can be a cylindrical, annular portion surrounding the first portion. The first portion can be a first cylindrical layer and the second portion can be a second cylindrical layer adjacent the first portion, the first and second portions having the same diameter. The first portion can be a conical portion embedded in the second portion.

Implementations of the method can include one or more features of other aspects.

In general, in another aspect, the invention features a method of making a contact lens, including: forming (e.g., printing, e.g., using an ink jet printer) a plurality of discrete dots of material in a pattern (e.g., an annular pattern) on a transfer substrate; aligning the pattern with a surface of a contact lens; contacting the pattern with the surface of the contact lens; and releasing the dots of material from the transfer substrate while the dots are in contact with the surface to transfer the pattern of dots to the surface of the contact lens.

In general, in a further aspect, the invention features a method of making a contact lens that includes molding a first portion to provide an annular portion formed from an inhomogeneous, optically-scattering material surrounding an aperture, and molding the contact lens by combining, in a mold, the first portion and a homogenous, optically clear material such that the aperture is filled with the homogenous, optically clear material.

Implementations of the method can include one or more of the following features and/or features of other aspects. For example, the annular portion can be embedded in the homogeneous, optically clear material. In some embodiments, the annular portion surrounds the homogeneous, optically clear material.

In general, in another aspect, the invention features a button for making a contact lens, including: a first region formed from a homogenous, optically clear material; and a second region formed from an inhomogeneous, optically-scattering material. The button is shaped as a cylinder.

Implementations of the method can include one or more of the following features and/or features of other aspects. For example, the first region can be a cylindrical inner core and wherein the second region is can be annular cladding surrounding the first region. The first region can be a bottom layer and the second region can be a top layer, wherein the top layer and the bottom layer form an interface substantially parallel to the first flat surface and the second flat surface. In some embodiments, the first region is a cone, and the second region is configured to surround the first region.

In general, in a further aspect, the invention features a method of making a contact lens, including: dispensing a lens forming material to a first mold part comprising a concave mold surface, wherein the concave mold surface includes a plurality of surface features; pressing a second mold part comprising a convex mold surface to the first mold part to conform to the concave mold surface and the convex mold surface; applying conditions sufficient for the lens forming material to take on and maintain a shape formed by the concave mold surface and the convex mold surface; and separating the first mold part and the second mold part. The concave and/or convex mold surfaces include a plurality of protrusions and/or depressions such that the contact lens includes a plurality of light scattering dots on at least one of the contact or convex concave lens surface.

Implementations of the method can include one or more features of other aspects.

DETAILED DESCRIPTION

Figure 1A:
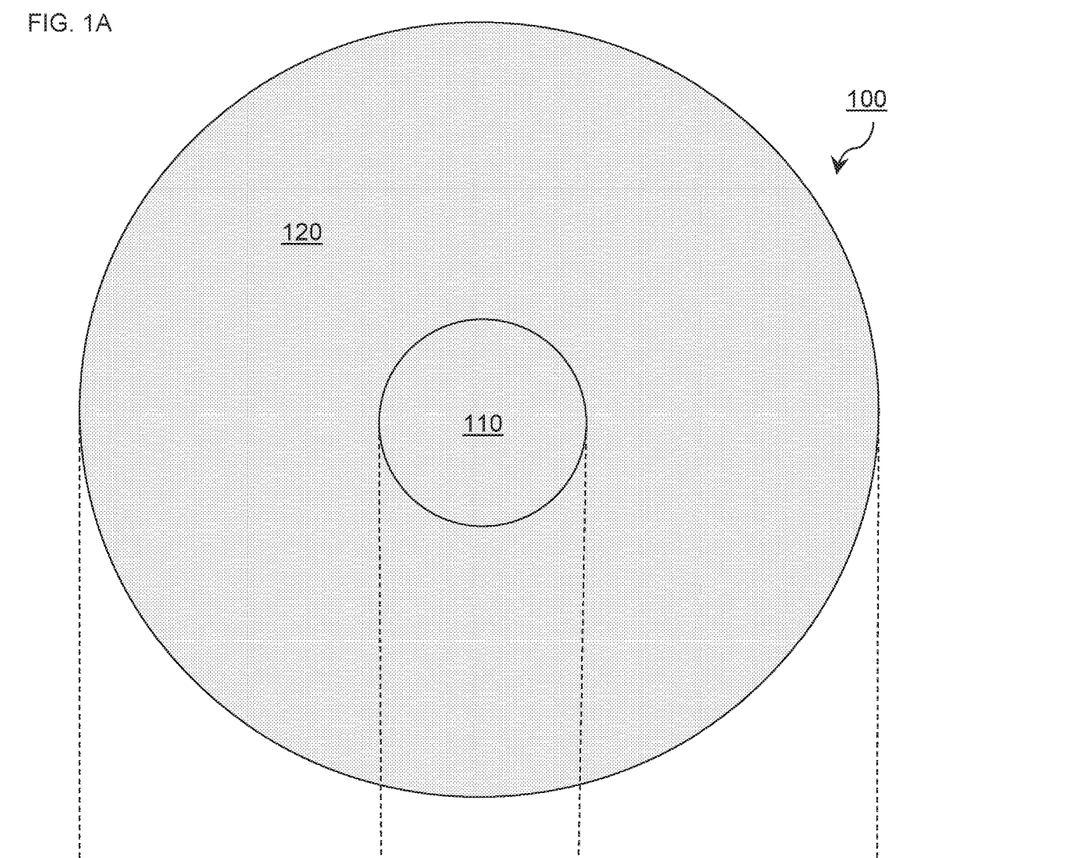
FIG. 1A is a plan view of an embodiment of a myopia-reducing contact lens.
Figure 1B:
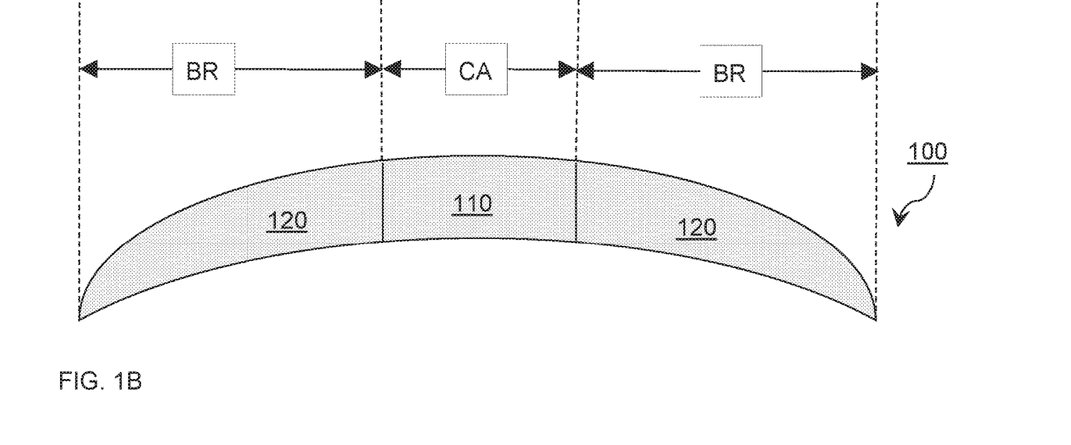
FIG. 1B is a cross-sectional side view of the myopia-reducing contact lens shown in FIG. 1A.

Referring to FIGS. 1A and 1B, a myopia-reducing contact lens 100 includes a clear aperture 110 and a blurring region 120. Clear aperture 110 has a lateral diameter CA. Blurring region 120 has a radial lateral dimension BR, where 2BR+CA is the diameter of the contact lens.

The size and shape of the clear aperture 110 may vary. Generally, the clear aperture 110 provides the wearer with a viewing cone for which their visual acuity may be optimally corrected (e.g., to 20/15 or 20/20). Typically, the lateral diameter CA is less than the user's pupil diameter under normal indoor lighting conditions (e.g., such as typical classroom or office lighting in which a user is able to easily read text from a book). This ensures that, under such lighting conditions, image contrast in the user's peripheral visual field is reduced.

In some embodiments, the aperture has a lateral diameter CA in a range from about 0.2 mm (e.g., about 0.3 mm or more, about 0.4 mm or more, about 0.5 mm or more) to about 2 mm (e.g., in a range from about 0.75 mm to about 1.75 mm, in a range from about 0.9 mm to about 1.2 mm, about 0.6 mm or more, about 0.7 mm or more, about 0.8 mm or more, about 0.9 mm or more, about 1 mm or more, about 1.1 mm or more, about 1.2 mm or more, about 1.9 mm or less, about 1.8 mm or less, about 1.7 mm or less, about 1.6 mm or less, about 1.5 mm or less, about 1.4 mm or less, about 1.3 mm or less).

The clear aperture 110 can subtend a solid angle of about 30 degrees or less (e.g., about 25 degrees or less, about 20 degrees or less, about 15 degrees or less, about 12 degrees or less, about 10 degrees or less, about 9 degrees or less, about 8 degrees or less, about 7 degrees or less, about 6 degrees or less, about 5 degrees or less, about 4 degrees or less, about 3 degrees or less) in the viewer's visual field. The solid angles subtended in the horizontal and vertical viewing planes may be the same or different.

In general, the blurring region 120 of contact lens 100 includes scattering centers which scatter at least some of the light passing through the lens in this region that would otherwise contribute to an image on a wearer's retina. Accordingly, scenes viewed through the blurring region 120 are blurred relative to the same scene viewed by the wearer through the clear aperture 110. Generally, the scattering centers can be formed on a surface of the contact lens 100 and/or through the body of the lens itself.

In some embodiments, scattering centers are in the form of bumps ("protrusions") on a surface of the contact lens. For example, referring to FIG. 2A, a contact lens 200 includes an array of protrusions 210 on a surface 202 of the lens. The protrusions can be arranged to have an order (e.g., as an ordered array) or arranged randomly.

In some embodiments, scattering centers are in the form of pits ("depressions") on a surface of the contact lens. For example, referring to FIG. 2B, a contact lens 220 includes an array of pits 230 on a surface 222 of the lens. The depressions can be arranged to have an order or arranged randomly.

The scattering centers are sized and shaped so that the scattering centers scatter incident light to reduce contrast of an object viewed through the reduced contrast areas. The scattering centers may be substantially spherical, ellipsoidal, or irregularly-shaped. Generally, the scattering centers should have a dimension (e.g., diameter, if spherical) that is sufficient large to scatter visible light, yet sufficiently small so as not to be resolved by the wearer during normal use. For example, the scattering centers can have a dimension (as measured in a tangential plane to the lens surface) in a range from about 0.001 mm or more (e.g., about 0.005 mm or more, about 0.01 mm or more, about 0.015 mm or more, about 0.02 mm or more, about 0.025 mm or more, about 0.03 mm or more, about 0.035 mm or more, about 0.04 mm or more, about 0.045 mm or more, about 0.05 mm or more, about 0.055 mm or more, about 0.06 mm or more, about 0.07 mm or more, about 0.08 mm or more, about 0.09 mm or more, about 0.1 mm) to about 1 mm or less (e.g., about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm).

Note that for smaller scattering centers, e.g., having a dimension that is comparable to the wavelength of light (e.g., 0.001 mm to about 0.05 mm), the light scattering may be considered Rayleigh or Mie scattering. For larger scattering centers, e.g., about 0.1 mm or more, light scattering may be due to a lensing effect of the scattering center, such as due to focusing by a lens with a very small radius of curvature to a point far in front of the user's retina. In such a case, when the light from each scattering center reaches the user's retina, it has substantially diverged from its point of focus and is not resolvable as an image by the user.

In general, the dimension of the scattering centers may be the same across the lens or may vary. For example, the dimension may increase or decrease as a function of the location of the scattering center, e.g., as measured from the clear aperture and/or as a function of distance from an edge of the lens.

The spacing of the scattering centers can also vary to provide the desired optical effect. Typically, the spacing of the scattering centers (i.e., as measured between the center of adjacent scattering centers) are in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more) to about 1 mm (e.g., about 0.9 mm or less, about 0.8 mm or less, about 0.7 mm or less, about 0.6 mm or less, about 0.5 mm or less).

It is believed that light from a scene that is incident on the lenses in blurring region 120 between the scattering centers contributes to an image of the scene on the user's retina, while light from the scene incident on the scattering centers does not. Moreover, the light incident on the scattering centers is still transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the scattering centers. Generally, scattering centers occupy at least 10% (e.g., 20% or more, 30% or more, 40% or more, 50% or more, such as 90% or less, 80% or less, 70% or less, 60% or less) of the area of blurring region 120.

In general, the scattering centers reduces the contrast of images of objects in the wearer's peripheral vision without significantly degrading the wearer's visual acuity in this region. Here, peripheral vision refers to the field of vision outside of the field of the clear aperture. Image contrast in these regions can be reduced by 40% or more (e.g., 45% or more, 50% or more, 60% or more, 70% or, more, 80% or more) relative to an image contrast viewed using the clear aperture of the lens as determined. Contrast reduction may be set according to the needs of each individual case. It is believed that a typical contrast reduction would be in a range from about 50% to 55%. Contrast reductions of lower than 50% may be used for very mild cases, while subjects who are more predisposed might need a higher than 55% contrast reduction. Peripheral visual acuity can be corrected to 20/30 or better (e.g., 20/25 or better, 20/20 or better) as determined by subjective refraction, while still achieving meaningful contrast reduction.

Contrast, here, refers to the difference in luminance between two objects within the same field of view. Accordingly, contrast reduction refers to a change in this difference.

Figure 2A:
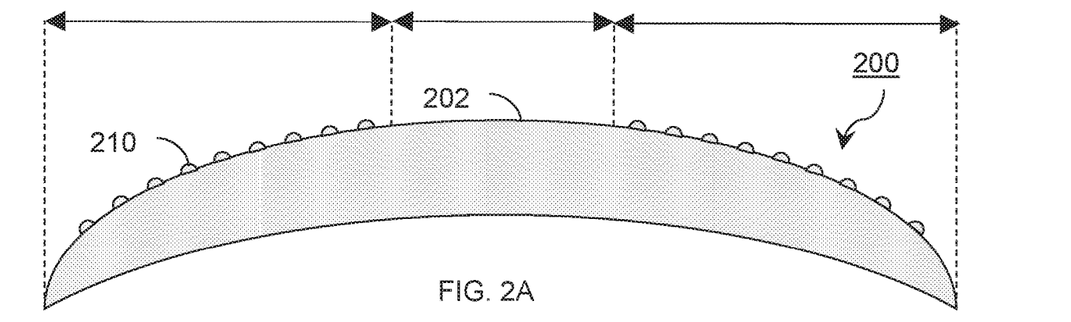
FIG. 2A is a cross-sectional side view of an embodiment of a myopia-reducing contact lens that includes protrusions on a surface in the lens's blurring region.
Figure 2B:
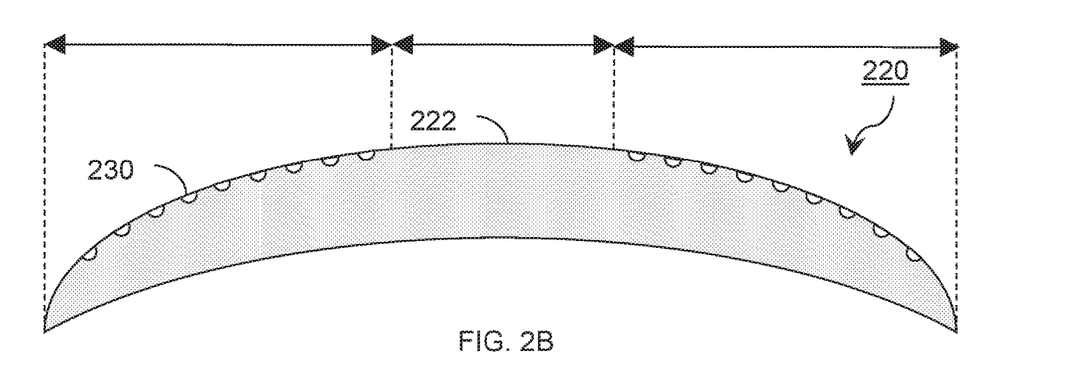
FIG. 2B is a cross-sectional side view of an embodiment of a myopia-reducing contact lens that includes pits on a surface in the lens's blurring region.

While the surface scattering centers are shown on the convex lens surface in FIGS. 2A and 2B, alternatively or additionally, scattering centers can also be formed on the concave surface.

In certain embodiments, scattering centers are in the form of discrete inclusions within the body of the contact lens in the blurring region. For example, referring to FIG. 2C, a contact lens 240 includes a dispersion of scattering centers 250 dispersed through the otherwise continuous lens material.

In certain embodiments, scattering centers are confined to discrete layers within the body of the contact lens. For example, referring to FIG. 2D, a contact lens 260 includes a layer 262 in which a dispersion of scattering centers 270 is confined.

Figure 2C:
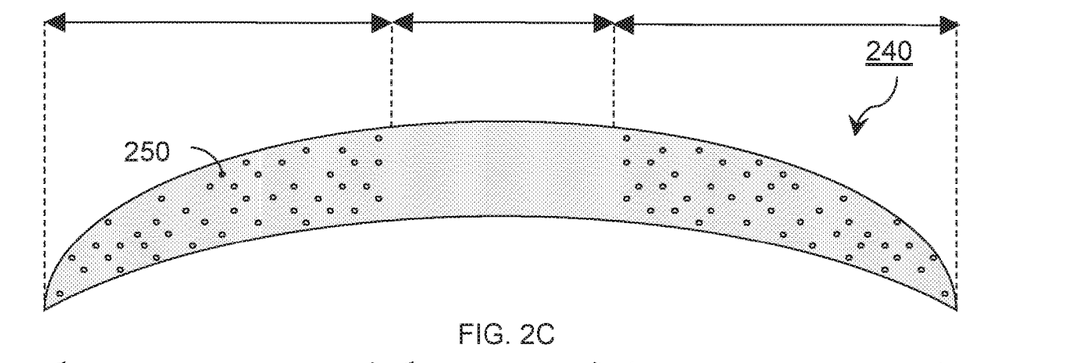
FIG. 2C is a cross-sectional side view of an embodiment of a myopia-reducing contact lens that has inclusions distributed throughout the lens's blurring region.
Figure 2D:
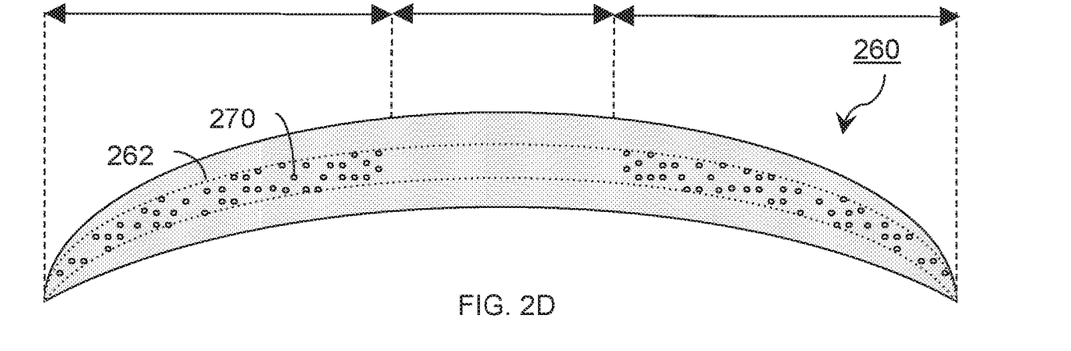
FIG. 2D is a cross-sectional side view of an embodiment of a myopia-reducing contact lens that has inclusions confined to a discrete layer in the lens's blurring region.

While the inclusions shown in FIGS. 2C and 2D are discrete inclusions, other forms of inclusions are also possible. For example, in some embodiments, light scattering in the blurring region is provided by a network of material distributed through all or a portion of the lens's blurring region. For example, a cross-linked polymer network (e.g., formed from a multifunctional acrylate monomer or oligomer) can provide scattering inclusions that have a similar effect as discrete inclusions. Generally, such a polymer network is sufficiently diffuse to accommodate an interstitial material that permeates the network. The interface between the network and interstitial material provides the optical interface for light scattering.

In general, scattering centers can be included in a contact lens in a variety of ways. In some embodiments, the contact lens can be formed first and the features can be added through subsequent processing. Alternatively, features can be formed as part of the contact lens manufacturing process. Examples of each of these two modalities are described below.

In some implementations scattering centers (dots) are formed by depositing dots on the surface of an already-formed contact lens.

Ink-jetting methods for forming dots on a lens are described, for example, in a provisional application with application No. 62/369,351, entitled SPECTACLE LENSES FOR REDUCING SIGNALS IN THE RETINA RESPONSIBLE FOR GROWTH OF EYE LENGTH to inventors Jay Neitz, James Kuchenbecker, and Maureen Neitz, filed on Aug. 1, 2016, the entire contents of which are incorporated herein by reference.

In general, the body of the contact lens are formed from optically transparent materials. The optically transparent materials can be rigid or soft. Examples of rigid materials include fluorosilicone acrylates and silicone acrylates. Generally, silicone acrylates have higher refractive indices than fluorosilicone acrylates. Fluorosilicone acrylates can have a refractive index ranging from 1.423 to 1.469. Silicone acrylates can have a refractive index ranging from 1.458 to greater than 1.473 (e.g., up to 1.480).

Soft materials are typically hydrogels, which are gel-like, water-containing plastics that are thin and pliable and conform to the front surface of the eye. A type of hydrogel that is widely used for contact lens is silicone hydrogel.

Examples of hydrogel that can be used for making soft contact lenses include balafilcon A, lotrafilcon B, etafilcon A, Narafilcon A, Galyfilcon A, Senofilcon A, Ocufilcon D, Hioxifilicon A, Enfilcon A, Comfilcon A, Nesofilcon A, Filicon II 3, Deleficon A, Methafilcon A/B, Vifilcon A, Phemfilcon A, Nelfilcon A, Stenfilcon A, Polymacon, Hefilcon B, Tetrafilcon A, Omafilcon A, Balafilcon A, Polymacon, Polymacon B, Hilafilcon B, Alphafilcon A, Other examples of hydrogels include tefilcon, lidofilcon B, etafilcon, bufilcon A, tetrafilcon A, surfilcon, bufilcon A, perfilcon, crofilcon, lidofilcon A, deltafilcon A, dimefilcon, ofilcon A, droxifilcon A, Ocufilcon B, hefilcon A & B, xylofilcon A, phemfilcon A, phemfilcon A, phemfilcon A, scafilcon A, ocufilcon, tetrafilcon B, isofilcon, methafilcon, mafilcon, vifilcon A, and polymacon.

Lotrafilcon B can have a refractive index of approximately 1.422. Etafilcon A can have a refractive index of approximately 1.405

The refractive index of the hydrogels can vary depending on hydration status, as refractive index of water is typically lower than the constituent materials of the hydrogels. For example, a dry hydrogel can have a refractive index of 1.51, and the same material when wet can have a refractive index of 1.41.

The scattering centers can be formed from optically transparent materials or optically opaque materials. In some embodiments, scattering centers can be formed from materials with a refractive index similar to the material forming the body of the contact lens. For example, for cases when the scattering centers are protrusions, depression, or discrete particles located on a surface of the contact lens, the geometry of the scattering centers can cause a scattering effect (e.g., by refraction or diffraction) that can reduce the contrast of the light without a contrast in refractive index between the scattering centers and the body of the contact lens.

In some other embodiments, scattering centers can be formed from materials with a refractive index substantially different from the material forming the body of the contact lens, such as a refractive index difference of 0.05 or more (e.g., 0.08 or more, 0.1 or more, 0.12 or more, 0.15 or more, 0.2 or more, 0.25 or more, such as up to about 0.4). Such materials provide a contrast in refractive index between the scattering centers and the surrounding medium. The contrast in refractive index, for example, can enable light scattering through Rayleigh or Mie scattering when scattering centers are embedded within the material forming the body of the contact lens.

In embodiments in which the scattering centers are embedded within the body of the contact lens, various pairs of materials can be contemplated.

For example, in the case of a rigid contact lens, fluorosilicone acrylates can be used to form the body and silicone acrylates can be used to form the scattering centers, or vice versa to potentially provide a range of refractive index contrast. For example, the refractive index contrast can be in a range from about 0.1% or more (e.g., about 0.25% or more, about 0.5% or more, about 0.75% or more, about 1.0%) to about 5% or less (e.g., about 4.5% or less, about 4.0% or less, about 3.5% or less, about 3.0% or less, about 2.5% or less, about 2.0% or less, about 1.5%).

In some embodiments, scattering centers can be formed from an inorganic glass material. In general, inorganic glasses can be formed from a variety of materials, in each case selected to provide the desired refractive index contrast. For example, fused silica can have a refractive index of approximately 1.46, and Schott Glass 8625 Biocompatible Glass can have a refractive index of approximately 1.53. Some classes of high-index glasses can have a range of refractive index of 1.50-1.90. Examples of high-index glasses include N-BK7, N-K5, B270/S1, Schott ZERO-DUR®, N-SK11, N-BAK4, N-BaK1, L-BAL35, N-SK14, N-SSK8, N-F2, BaSF1, N-SF2, N-LAK22, S-BaH11, N-BAF10, N-SF5, N-SF8, N-LAK14, N-SF15, N-BASF64, N-LAK8, N-SF18, N-SF10, S-TIH13, N-SF14, Sapphire, N-SF11, N-SF56, N-LASF44, N-SF6, N-SF57, N-LASF9, N-SF66.

In some embodiments, scattering centers can be formed from plastics. For example, polycarbonate materials or Trivex material used for making ophthalmic lenses can be used. Polycarbonate materials can have a refractive index that ranges from 1.58 to 1.74. Trivex material can have a refractive index of approximately 1.53.

In general, refractive index for described materials are measured at a wavelength between 560-600 nm, e.g. 587.6 nm (helium d-line) or 589.0 nm (sodium $D_2$-line).

Hydrated soft materials for soft contact lenses generally have a refractive index lower than foregoing materials for scattering centers. Accordingly, scattering centers formed from the foregoing materials can be embedded into soft materials to achieve a refractive index contrast.

In general, the material forming the body of the contact lens should be biocompatible. Criteria for biocompatibility can include cytotoxicity, genotoxicity, delayed type hypersensitivity, and irritation.

In some cases, materials having optical properties desirable for forming the scattering centers may not be biocompatible. In such cases, the lack of biocompatibility can potentially be mitigated by avoiding direct exposure of the non-compatible material to the surrounding environment (e.g., the eye). For example, the scattering center can be coated with a biocompatible material. As another example, the scattering center can be embedded in the body of the contact lens.

Figure 3A:
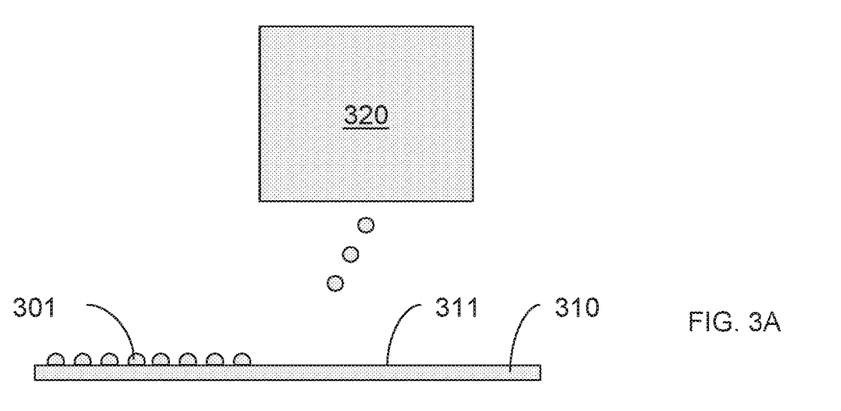
FIGS. 3A-3C are schematic diagrams showing different of a transfer process for forming a myopia-reducing contact.
Figure 3B:
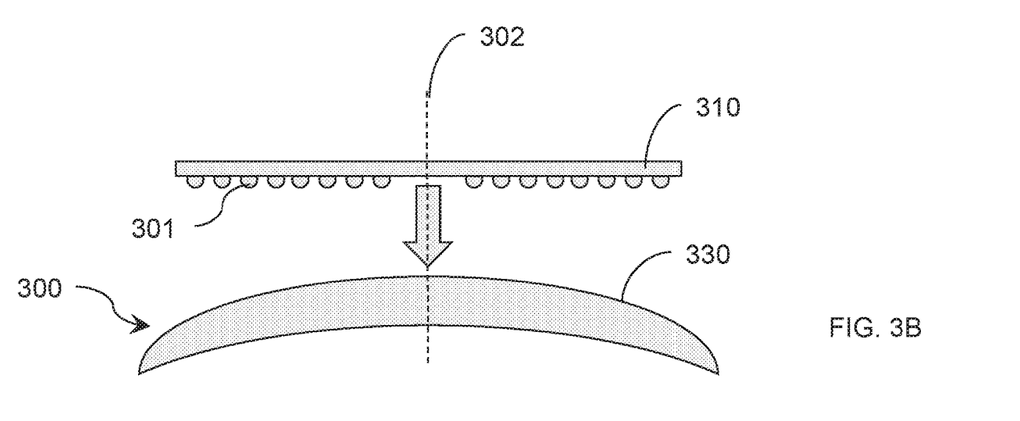

In some embodiments, dot patterns can be formed on a contact lens surface by a transfer process. For example, referring to FIG. 3A, a dot pattern 301 is formed on a surface 311 of a transfer substrate 310 using an ink jet printer 320. Dot pattern 301 is transferred to a surface 330 of a contact lens 300 as follows. Referring to FIG. 3B, transfer substrate 310 is aligned with contact lens 300 having an optical axis 302 so that the aperture in dot pattern 301 is aligned with the optical axis 302 of the lens. The transfer substrate is aligned with surface 311 facing surface 330 of the contact lens. Once aligned, the substrate is placed in contact with contact lens 300, sandwiching dot pattern 301 between the contact lens and the transfer substrate. The contact is performed under conditions sufficient to cause the dots to adhere to surface 330 of the contact lens. For example, contact can be performed at an elevated temperature (e.g., higher than room temperature) and/or pressure (e.g., higher than atmospheric pressure).

Figure 3C:
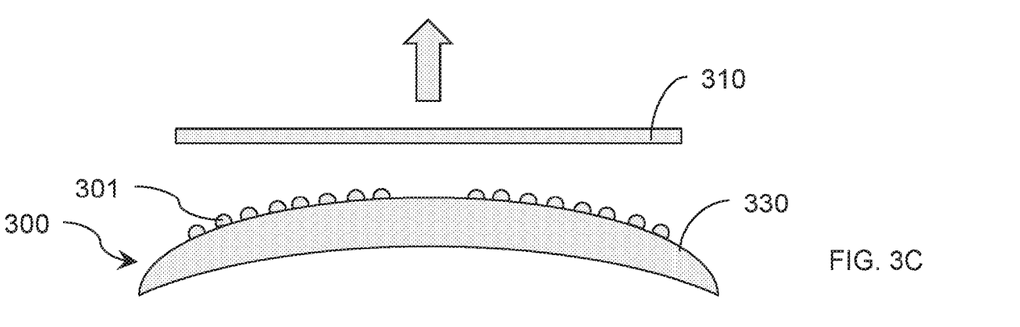

Referring to FIG. 3C, after sufficient time to allow for the dots to adhere to surface 330 of contact lens 300, transfer substrate is withdrawn from the contact lens, releasing dot pattern 301 from the transfer substrate.

In some cases, pressure and heat alone are sufficient to transfer the dots to surface 330.

Alternatively, or additionally, contact lens 300 and transfer substrate 310 are exposed to additional stimuli while they are in contact in order to facilitate transfer of dot pattern 301. For example, in some embodiments, the dots can be exposed to radiation through either the transfer substrate and/or through the contact lens, e.g., to either (or both) enhance adhesion between the dots and surface 330 of contact lens 300 or promote release of the dots from surface 311 from transfer substrate 310.

In some embodiments, the transfer process includes post-transfer steps. For example, contact lens 300 can be exposed to radiation, heat, and/or materials in order to, e.g., promote adhesion between the dots and surface 330 and/or harden the dot material.

In some embodiments, scattering inclusions are formed within the body of a contact lens by exposing the contact lens to laser radiation. The laser radiation locally changes the optical properties of the contact lens material at the exposed areas, creating an optical scattering feature. By selectively exposing the contact lens surface to laser radiation, an inclusion distribution can be formed in the body of the contact lens. For example, the laser's beam can be moved relative to the contact lens while the beam is pulsed. Relative motion between the beam and the contact lens surface can be caused by moving the beam while leaving the surface fixed, moving the surface while leaving the beam fixed, or moving both the beam and the surface.

Figure 4:
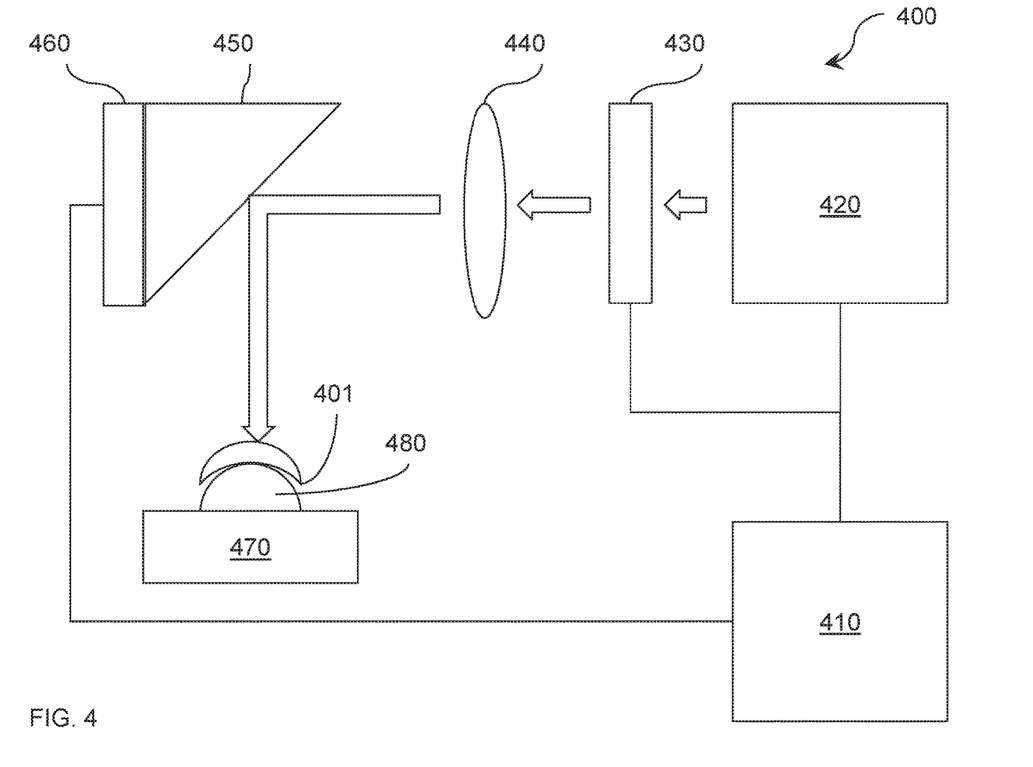
FIG. 4 is a schematic diagram of an embodiment of a laser system for forming myopia-reducing contact lenses.

Referring to FIG. 4, a laser system 400 for forming scattering inclusions within a contact lens 401 includes a laser 420, a beam chopper 430, focusing optics 440, a mirror 450, and a stage 470. Laser 420 directs a laser beam towards mirror 450, which deflects the beam towards contact lens 401 which is positioned relative to the mirror 450 by stage 470. An actuator 460 (e.g., a piezoelectric actuator) is attached to mirror 450. The stage includes a curved mounting surface 480 which supports contact lens 401. Laser system 400 also includes a controller (e.g., a computer controller) in communication with laser 420, beam chopper 430, and actuator 460.

Beam chopper 430 and focusing optics 440 are positioned in the beam path. Chopper 430 periodically blocks the beam so that contact lens 401 is exposed to discrete pulses of laser light. Focusing optics 440, which generally includes one or more transmissive optical elements (e.g., one or more lenses), focuses the beam to a sufficiently small spot on the surface of contact lens 401 so that the area ablated by the beam on the lens surface corresponds to the desired inclusion size. Actuator 460 changes the orientation of mirror 450 with respect to the beam to scan the pulsed beam to different target points on the contact lens surface. Controller 410 coordinates the operation of laser 420, chopper 430, and actuator 460 so that the laser system form a predetermined inclusion distribution within the contact lens.

In some implementations, stage 470 also includes an actuator. The stage actuator can be a multi-axis actuator, e.g., moving the contact lens in two lateral dimensions orthogonal to the beam propagation direction. Alternatively, or additionally, the actuator can move the stage along the beam direction. Moving the stage along the beam direction can be used to maintain the exposed portion of the lens surface at the focal position of the beam, notwithstanding the curvature of the lens surface, thereby maintaining a substantially constant exposure area across the lens. The stage actuator can also be controlled by controller 410, which coordinates this stage motion with the other elements of the system. In some embodiments, a stage actuator is used in place of the mirror actuator.

Generally, laser 420 can be any type of laser capable of generating light with at an appropriate wavelength and with sufficient energy to cause the desired photochemical reaction in the contact lens material. Gas lasers, chemical lasers, dye lasers, solid state lasers, and semiconductor lasers can be used.

The pulse duration and pulse energy are typically selected so that each pulse interacts with the contact lens material to form scattering inclusions of a desired size.

Figure 5A:
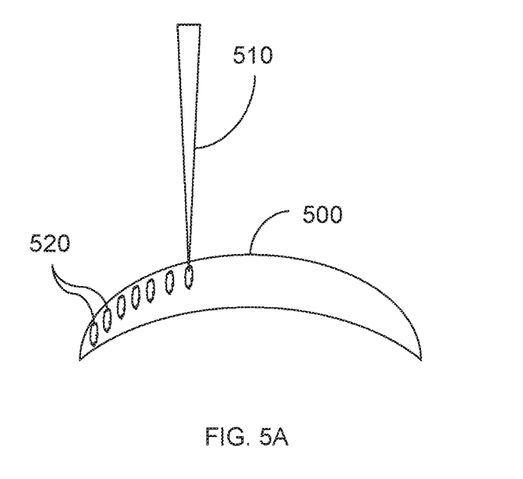
FIG. 5A is a schematic diagram illustrating formation of scattering inclusions in a contact lens by selective exposure to laser radiation.

The inclusion-formation process is illustrated in FIG. 5A, which shows a focused laser beam 510 selectively exposing discrete regions of a contact lens 500 to laser radiation. In some implementations, the laser radiation photoinitiates a chemical reaction in the contact lens material, forming discrete inclusions which optically scatter light passing through the lens. In some other implementations, the laser radiation is locally absorbed by the material through multi-photon absorption, creating micro-cracks that can act as scattering centers.

Figure 5B:
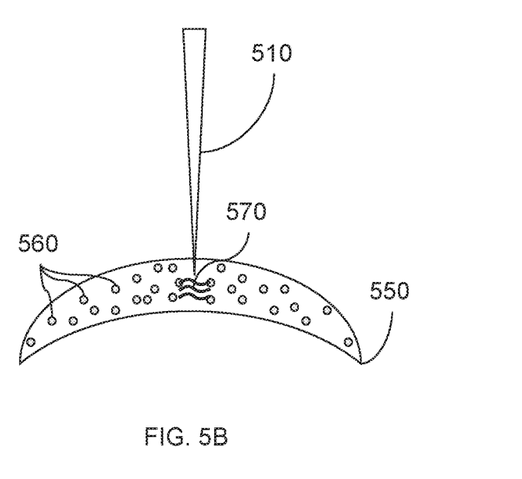
FIG. 5B is a schematic diagram illustrating formation of a clear aperture in a contact lens by selective exposure to laser radiation.

Alternatively, in some implementations, selective laser radiation can be used to form a clear aperture in a contact lens material that includes scattering centers dispersed therein. This process is illustrated in FIG. 5B. Here, contact lens 550 is formed from a material that includes discrete particles 560 dispersed throughout a continuous phase material 570, including in the region at/near the optical axis of the lens. Upon exposure to focused laser beam 510, heat from the laser beam causes material from nearby particles to diffuse into the continuous phase material, resulting in the formation of an optically homogenous region corresponding to the clear aperture of the lens.

For example, the discrete particles 560 can be formed from the continuous phase material 570 but additionally include dopants that modifies the refractive index of the particles 560. The dopants can increase or decrease the refractive index of the material 570 to achieve an index contrast between the particles 560 and the material 570.

Upon heating by the laser beam to a temperature sufficient for dopant diffusion (e.g. near the melting temperature of the material 570), the dopant can diffuse to surround material 570. The diffusion can reduce or eliminate the index contrast between the particles 560 and the material 570, forming an optically homogenous region.

Figure 6A:
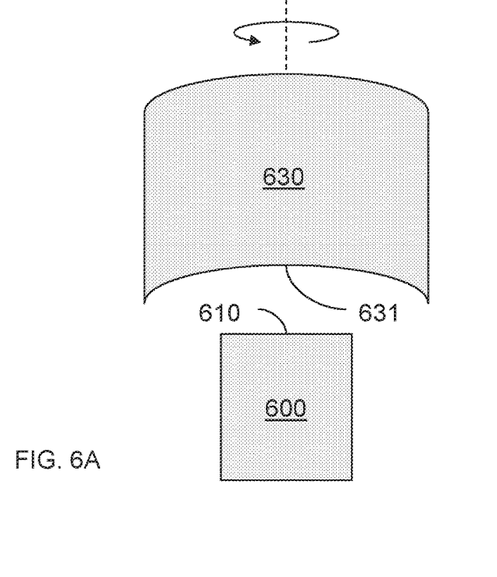
FIGS. 6A and 6B are schematic diagrams illustrating an embodiment of grinding a convex surface of a contact lens from a button.

In certain implementations, myopia-reducing contact lenses are ground from a cylindrical lens blank, or button. Referring to FIGS. 6A-6D, a button 600 is ground in a two-step process to produce the contact lens. Referring to FIG. 6A, in a first step, a first side of button 600 is ground using a grinding tool 630 having a concave grinding surface 631 having the desired curvature of the convex lens surface. Grinding is generally performed by pressing on end 610 of button 600 against the tool while rotating the tool. This process removes material from button 600, forming a convex surface with the same curvature as concave grinding surface 631.

Figure 6B:
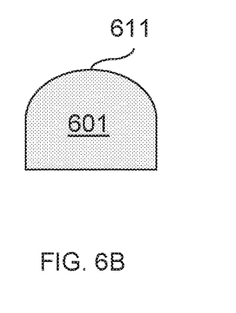

Referring to FIG. 6B, the resulting partially-ground button 601 has its original cylindrical form on the unground side, but features a convex lens surface 611 on the opposite side.

Figure 6C:
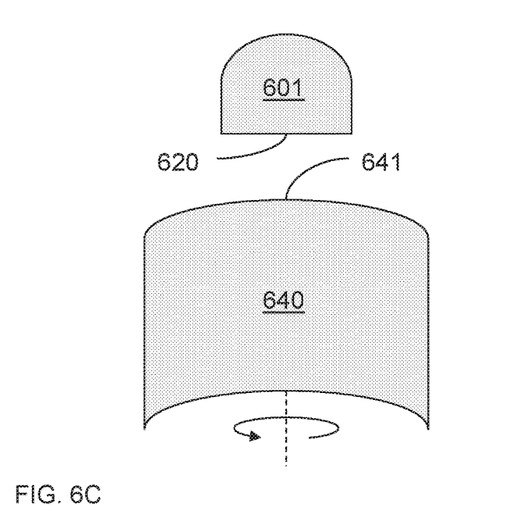
FIGS. 6C and 6D are schematic diagrams illustrating an embodiment of grinding a concave surface of a contact lens from a button.
Figure 6D:
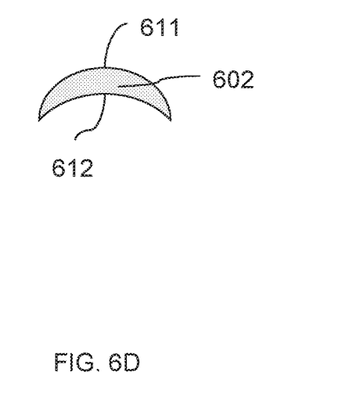

Referring to FIG. 6C, next, the opposite side 620 of partially-ground button 601 is ground using a grinding tool 640 having a convex grinding surface 641 with the desired curvature of the concave lens surface. Referring to FIG. 6D, the result of the second grinding step is a contact lens 602, with convex surface 611 and concave surface 612.

Additional polishing steps may be performed on either surface to achieve the desired level of surface smoothness.

Buttons for forming myopia-reducing contact lenses can be formed in variety of ways. Generally, they are multi-component items, formed from a portion of clear material (which will ultimately correspond to the clear aperture of the contact lens), and a portion composed of a dispersion (which will ultimately correspond to the blurring region).

A dispersion in which scattering centers are suspended throughout can be formed in various ways. In some implementations, the dispersion can be formed by mixing in scattering centers (e.g., particles, beads, or spheres formed from previously described materials having a refractive index contrast in relation to FIGS. 2A-2D) into a liquid lens forming material, followed by a solidifying process (e.g., curing).

Figure 7A:
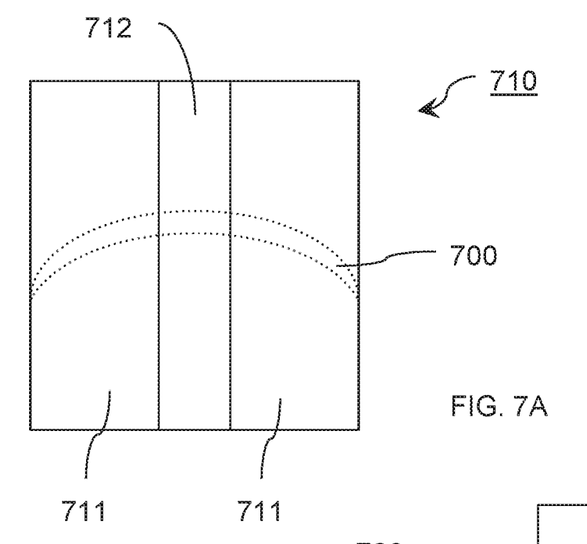
FIG. 7A is a cross-sectional view of an embodiment of a button for forming a myopia-reducing contact lens.

In some embodiments, the button is formed from two concentric layers, in which the central cylindrical layer is formed from the clear material while the outer, annular layer is formed from the dispersion. For example, referring to FIG. 7A, which shows a cylindrical button 710 in cross-section, button 710 is composed of inner core 712, surrounded by an annular cladding 711. Core 712 is formed from a clear (i.e., optically clear) material, while cladding 711 is formed from a dispersion. The shape of the contact lens 700 shows how core 712 provides the clear aperture for the lens, while cladding 711 provides the blurring region. For example, a grinding process as described in FIGS. 6A-6C can be used to form the contact lens 700.

Figure 7B:
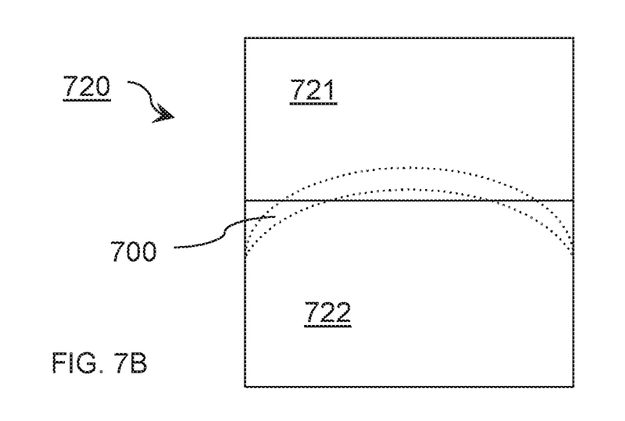
FIG. 7B is a cross-sectional view of another embodiment of a button for forming a myopia-reducing contact lens.

In certain embodiments, buttons are formed from a layer of clear material on top of a layer of the dispersion. For example, referring to FIG. 7B, a cylindrical button 720 is formed from a top, clear layer 721 and a bottom layer 722 formed from a dispersion. The grinding process as described in FIGS. 6A-6C can be used to form the contact lens 720. Once ground, the curvature of lens 700 leads to the central part of the lens being formed from the clear material (layer 721), while the outer parts of the lens is formed from the dispersion (layer 722). By controlling the amount of material removed from the first and second side of the cylindrical button 720, the diameter CA of the clear aperture can be controlled over a limited range.

Figure 7C:
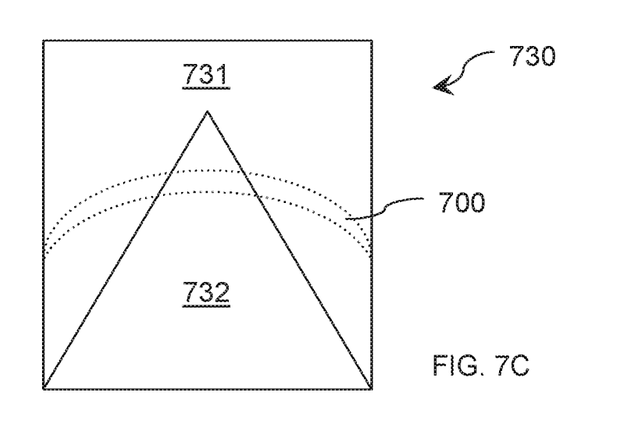
FIG. 7C is a cross-sectional view of yet a further embodiment of a button for forming a myopia-reducing contact lens.
Figure 8A:
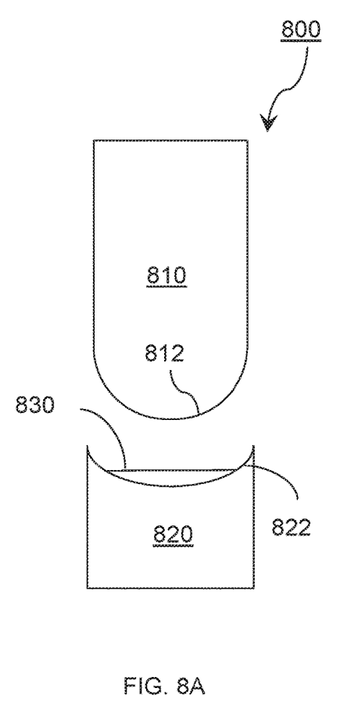
FIGS. 8A-8C are schematic diagrams showing different steps in an implementation of a contact lens molding process.
Figure 8B:
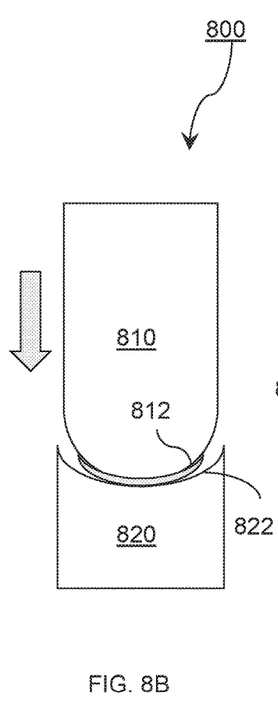
Figure 8C:
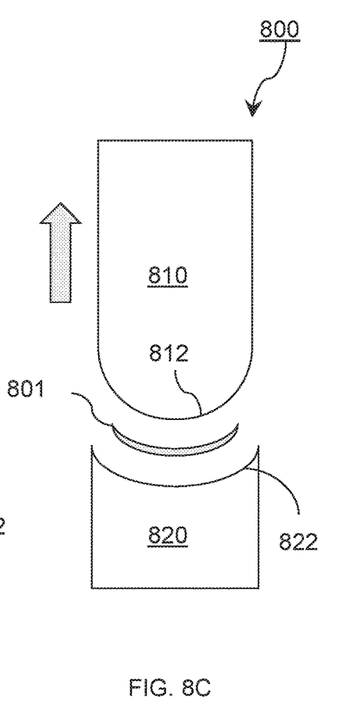

In some cases, buttons are formed from a conical volume of clear material embedded within the dispersion. For example, referring to FIG. 7C, a cylindrical button 730 is formed from a conical portion 732 embedded within a cylindrical casing 731. Conical portion 732 is formed from a clear material, while casing 731 is formed from a dispersion. Once ground, contact lens 700 includes a central portion corresponding to the clear material of cylindrical portion 732, and an outer portion corresponding to the dispersion of casing 731. Note that the relative size of the clear aperture and blurring region (i.e., CA vs. BR, see FIGS. 1A-B) depend on the depth to which the button is ground. Accordingly, such buttons can be used to form contact lenses with varying clear aperture sizes. As noted previously, rather than being ground from a button, contact lenses can also be molded. Referring to FIGS. 8A-8C, generally, contact lens molding involves curing a contact lens material between two curved surfaces, one concave the other convex, corresponding to the desired curvatures of the contact lens surfaces. In the embodiment shown in these figures, the mold 800 is composed of a first mold part 810 having a convex mold surface 812 and a second mold part 820 having a concave mold surface 822. The lens forming process involves injecting a lens forming material 830 into the concave surface 822 of mold part 820, as illustrated in FIG. 8A. Mold parts 810 and 820 are then pressed together, as shown in FIG. 8B, forcing the lens forming material to conform to convex surface 812 on one side and to concave surface 822 on the other side. Mold parts 810 and 820 are held together sufficiently long and under conditions sufficient for the lens forming material to take on and maintain the shape of contact lens 801.

The lens forming material 830, in general, are polymerizable compositions. Polymerizable compositions can be used to form previously described hydrogels. An example of a polymerizable composition suitable for making soft contact lenses includes vinyl-containing monomers, vinyl-containing cross-linking agents, and siloxane monomers. This composition, when cured, can form a silicone hydrogel. Some polymerizable compositions can be photopolymers, which can be cured using light. Some polymerizable compositions can be thermosetting polymers.

Generally, the conditions under which the lens is molded depends on the lens forming materials being used. These conditions can include pressing the parts together with sufficient pressure and/or at an elevated temperature so that the lens forming material takes on the appropriate shape. For certain materials, e.g., thermosetting polymers, the temperature can be reduced once the lens is molded to set the lens shape.

For a silicone hydrogel, the conditions can include curing at an elevated temperature, e.g., between 50-95° C., for durations, e.g., between 15-60 minutes. In some cases, the curing can be done in multiple stages, progressively increasing the temperature until curing is complete.

For photopolymers, the conditions can include illumination by visible or UV radiation to initiate polymerization, which can allow the lens forming material to maintain the shape of contact lens 801.

After sufficient time for the shape of contact lens 801 to set, the mold parts are separated and the lens is removed from the mold as illustrated in FIG. 8C.

In general, molding can be used to form myopia-reducing contact lenses with scattering centers on their surface or scattering centers dispersed through the body of the lens.

Figure 9A:
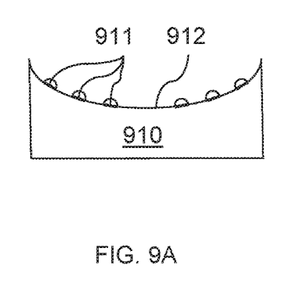
FIG. 9A is a schematic diagram showing, in cross-section, a mold part for forming depressions on a convex surface of a contact lens.

FIG. 9A shows a mold part 910 for forming depressions on a convex surface of a contact lens. Specifically, concave mold surface 912 includes protrusions 911 arranged in a pattern. During the molding process, protrusions 911 imprint depressions on the corresponding convex surface of the lens.

Figure 9B:
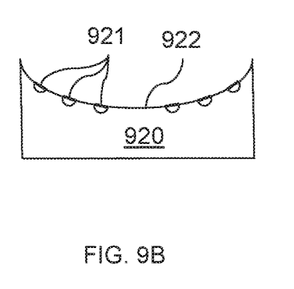
FIG. 9B is a schematic diagram showing, in cross-section, a mold part for forming protrusions on a convex surface of a contact lens.

FIG. 9B shows a mold part 920 for forming protrusions on a convex surface of a contact lens. Here, concave mold surface 922 includes depressions 921 arranged in a pattern. During the molding process, depressions 921 fill with contact lens material, resulting in protrusions on the corresponding convex surface of the lens.

Figure 9C:
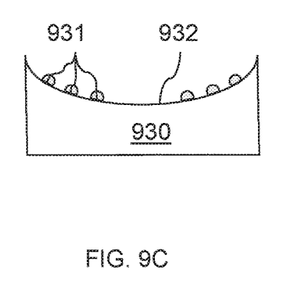
FIG. 9C is a schematic diagram showing, in cross-section, a mold part with discrete dots of material on its surface for embedding the dots in the convex surface of a contact lens.

In some cases, scattering centers can be embedded on a contact lens surface during the molding process. For example, referring to FIG. 9C, scattering particles 931 are deposited on a surface 932 of a mold part 930. During a subsequent lens molding step, the contact lens material fills in around particles 931, embedding the particles in the convex surface of the lens. Generally, the pattern of particles can be formed using a variety of techniques, including ink jet printing or transfer printing, for example.

Alternatively, or additionally, mold parts for forming depressions, protrusions, or inclusions on the concave surface of the lens surface can also be used.

While the foregoing examples show mold parts for forming or embedding scattering centers at or on one or both of the contact lens' surfaces, molding processes can also be used to form myopia-reducing contact lenses that include a dispersion of scattering centers through the body of the lens in the blurring region. In some embodiment, such contact lenses are formed using more than one molding step. For instance, a first molding step can be used to form the blurring region using a contact lens material that includes particles dispersed through the lens material. The clear aperture can then be formed in a second molding step. An example of such a process is illustrated in FIGS. 10A-10C.

Figure 10A:
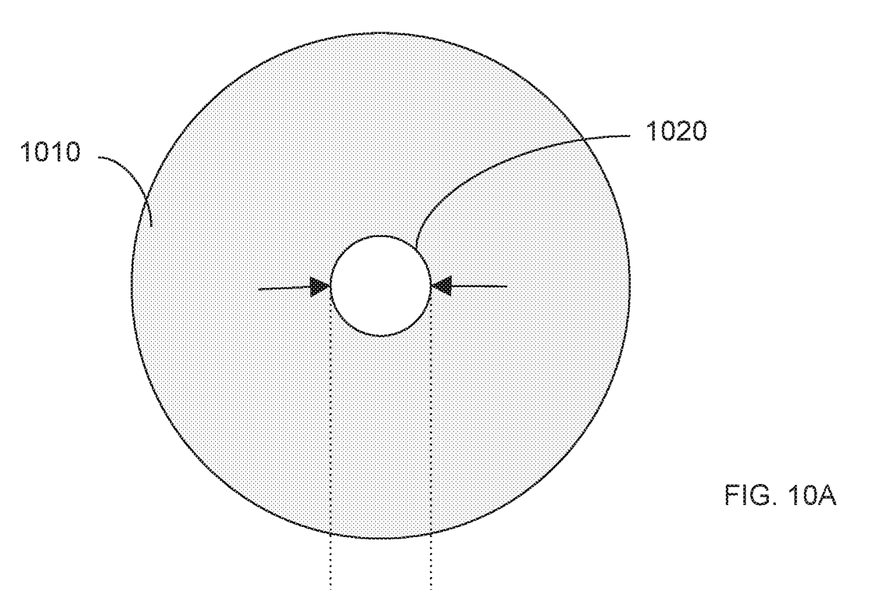
FIG. 10A shows a plan view of a molded portion of a myopia-reducing contact lens.
Figure 10B:
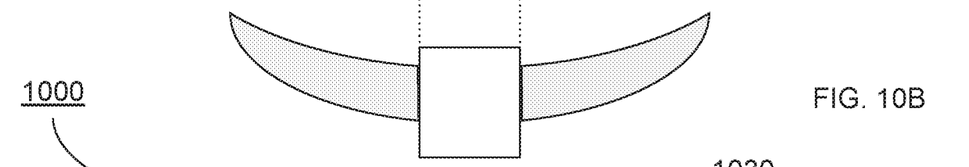
FIG. 10B shows a cross-sectional view of the molded portion of the myopia-reducing contact lens shown in FIG. 10A.

Referring to FIG. 10A, a molded portion 1010 with a hole 1020 is shown. The molded portion 1010 can be formed, for example, using a molding process described in FIGS. 8A-8C, followed by formation of a hole 1020 defining the clear aperture. The molded portion 1010 corresponds to the blurring region, and can be formed, for example, using a dispersion. The hole 1020 can be formed using various processes, including laser cutting, water jet cutting, lathing, and stamping. FIG. 10B shows a cross-sectional view of the molded portion 1010.

Figure 10C:
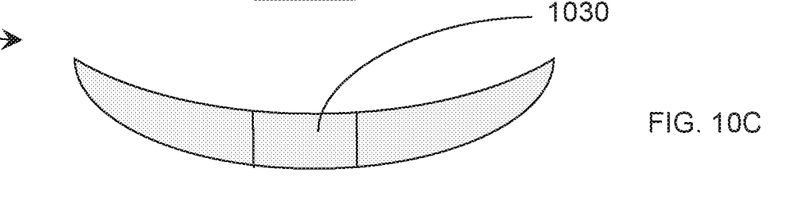
FIG. 10C shows a cross-sectional view of the complete myopia-reducing contact lens including the part shown in FIGS. 10A and 10B.

Referring to FIG. 10C, a myopia-reducing contact lens 1000 is shown. The contact lens 1000 can be formed by forming a clear aperture 1030. The clear aperture 1030 can be formed, for example, by filling in the hole 1020 with optically transparent materials that have been previously described, and repeating the molding process used to form the molded portion 1010. By using the same set of mold parts, discontinuities at an interface between the clear aperture 1030 and the molded portion 1010 can be minimized, and curvature of the lens surface can be maintained across the interface.

Figure 11A:
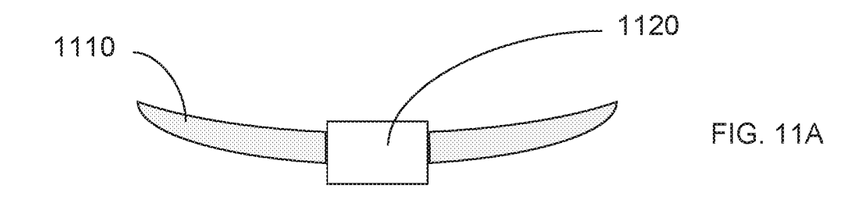
FIG. 11A shows a cross-sectional view of a molded portion of another myopia-reducing contact lens.
Figure 11B:
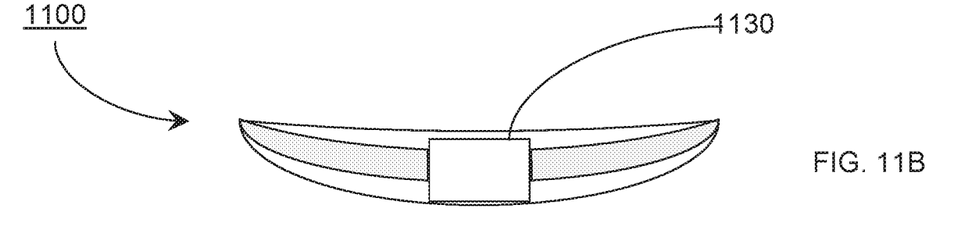
FIG. 11B shows a cross-sectional view of the complete myopia-reducing contact lens including the part shown in FIG. 11A.

Multi-step molding processes can also be used to embed a discrete layer of the dispersion within layers of optically transparent materials. For example, referring to FIGS. 11A-11B, a myopia-reducing contact lens 1100 can be formed by first forming a molded portion 1110 that is similar to the molded portion 1010 of FIG. 10A. Then, the molded portion 1110 can be embedded within layers of optically transparent material in various ways. For example, for a sufficiently viscous lens forming material, a first layer of the forming material can first be dispensed onto a mold similar to mold part 820 of FIG. 8A. Then, the molded portion 1110 can be placed on the first layer, followed by a second dispense of the forming material on top of the molded portion 1110 to fill in the hole 1120. At this point, the molded portion 1110 is suspended in the les forming material. Then, a molding process similar to FIGS. 8A-8C can be used to form the surfaces of the contact lens and set the shape of the resulting contact lens 1100.

Figure 12:
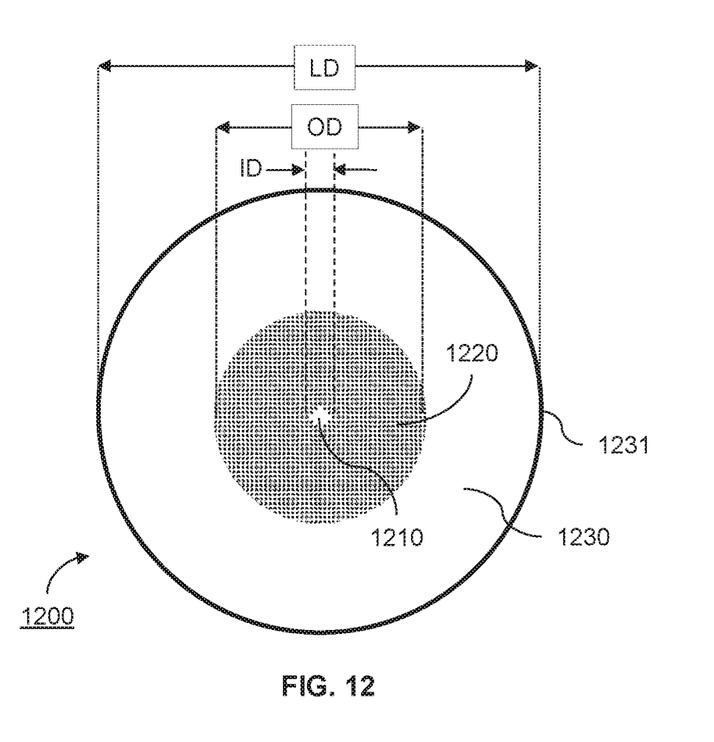
FIG. 12 is a plan view of another embodiment of a myopia-reducing contact lens.

While the embodiments of myopia-reducing contact lenses described above feature a clear aperture surrounded by a blurring region that extends to the edge of the contact lens, other embodiments are also possible. For example, in some embodiments, the blurring region does not extend all the way to the edge of the contact lens, but is surrounded by an outer clear region. An example of this is shown in FIG. 12, in which a contact lens 1200 which includes a clear aperture 1210, a reduced-contrast region 1220, and a clear outer region 1230. Reduced-contrast region 1220 is an annular region having an inner diameter ID and an outer diameter OD. ID corresponds to the diameter of clear aperture 1210. The contact lens has a lens diameter, LD, which is greater than OD.

Typically, ID is less than the user's pupil diameter under normal indoor lighting conditions (e.g., such as typical classroom or office lighting in which a user is able to easily read text from a book). This ensures that, under such lighting conditions, image contrast in the user's peripheral visual field is reduced. In some embodiments, ID is in a range from about 0.2 mm to about 2 mm (e.g., in a range from about 0.75 mm to about 1.75 mm, in a range from about 0.9 mm to about 1.2 mm, about 0.6 mm or more, about 0.7 mm or more, about 0.8 mm or more, about 0.9 mm or more, about 1 mm or more, about 1.1 mm or more, about 1.2 mm or more, about 1.9 mm or less, about 1.8 mm or less, about 1.7 mm or less, about 1.6 mm or less, about 1.5 mm or less, about 1.4 mm or less, about 1.3 mm or less).

Generally, OD is sufficiently large so that the reduced-contrast region extends beyond the user's pupil under normal indoor lighting conditions. In some embodiments, OD is about 2.5 mm or more (e.g., about 3 mm or more, about 4 mm or more, about 5 mm or more, such as about 10 mm or less, about 8 mm or less, about 7 mm or less, about 6 mm or less).

Generally, the dimensions and spacing between the dots in the contact lenses are selected so as to provide the desired optical effect (e.g., as described above). Similarly, the spacing of the dots can also vary so as to provide the desired optical effect (e.g., as described above).

LD corresponds to the diameter of the contact lens and is typically in a range from about 10-20 mm. Generally, LD is greater than OD by at least 1 mm or more (e.g., about 2 mm or more, about 3 mm or more, about 4 mm or more, about 5 mm or more, about 6 mm or more, about 7 mm or more, such about 8 mm). Including at least some space at the edge of the contact lens that does not include dots ensures that the dots do not reduce the integrity of the contact lens at its edge (e.g., by tearing) or reducing the integrity of the seal between the contact lens and the user's eyeball.

Contact lenses with a clear outer area can be formed using any of the methods described above. For example, where the contact lens is made by forming scattering centers on a lens surface, the centers can be formed only on the surface area corresponding to the annular blurring region. In embodiments formed by shaping the lens from a cylindrical button, the button can be formed from an additional annular portion formed from transparent material surrounding, for example, the buttons described above. In embodiments formed by injection molding, the molds can be sized so that the scattering portion does not extend radially as far as the clear portion.

A number of embodiments are described. Other embodiments are in the following claims.

What is claimed is:

1. A method of making a contact lens, the method comprising:
   dispensing a first lens material to a first mold part comprising a concave mold surface, the first lens forming material comprising an optically transparent material and a plurality of particles which form a plurality of light scattering centers of the contact lens;
   pressing a second mold part comprising a convex mold surface to the first mold part to cause the first lens material to conform to the concave mold surface and the convex mold surface;

applying conditions sufficient for the first lens material to take on and maintain a shape formed by the concave mold surface and the convex mold surface to produce a molded part, wherein the light scattering centers are distributed through a central region and a peripheral region of the molded part, and the molded part forms at least part of a body of the contact lens;

forming a hole in the central region of the molded part;

filling the hole with a second lens material comprising the optically transparent material to form a clear aperture of the contact lens;

pressing the second mold part to the first mold part to cause the second lens material to conform to the concave mold surface of the first mold part and the convex mold surface of the second mold part; and applying conditions sufficient for the second lens material to form the clear aperture of the contact lens between the concave mold surface and the convex mold surface.

2. The method of claim 1, wherein the light scattering centers form a contrast reducing region of the contact lens that reduces image contrast of a wearer in a peripheral visual field of a wearer of the contact lens.

3. The method of claim 1, wherein the clear aperture has a diameter in a range from about 0.2 mm to about 2 mm.

4. The method of claim 2, wherein the contrast reducing region extends to an edge of the contact lens.

5. The method of claim 1, wherein the light scattering centers are spaced apart by an amount in a range from about 0.05 mm to about 1 mm.

6. The method of claim 1, wherein the light scattering centers have a dimension in a range from about 0.001 mm to about 0.1 mm.

7. The method of claim 1, wherein the first lens material is a polymerizable composition.

8. The method of claim 7, wherein the polymerizable composition comprises vinyl-containing monomer.

9. The method of claim 7, wherein the polymerizable composition comprises a siloxane monomer.

10. The method of claim 7, wherein the polymerizable composition comprises a cross-linking agent.

11. The method of claim 7, wherein the polymerizable composition comprises a photopolymer.

12. The method of claim 7, wherein the polymerizable composition comprises a thermosetting polymer.

13. The method of claim 1, wherein the conditions sufficient for the first lens material to produce the molded part polymerize the first lens material.

14. The method of claim 13, wherein the polymerized first lens forming material is a component of a hydrogel.

15. The method of claim 1, wherein the light scattering centers are distributed through an entirety of the molded part.

16. The method of claim 1, wherein forming the hole in the central region of the molded part comprises:
    forming the hole in the central region of the molded part using a process selected from the group consisting of: a laser cutting process, a water jet cutting process, a lathing process, and a stamping process.

* * * * *